Sept. 24, 1957     K. W. OTT     2,807,456
HOT METAL CHARGING APPARATUS FOR OPEN HEARTH FURNACES
Filed Dec. 28, 1955
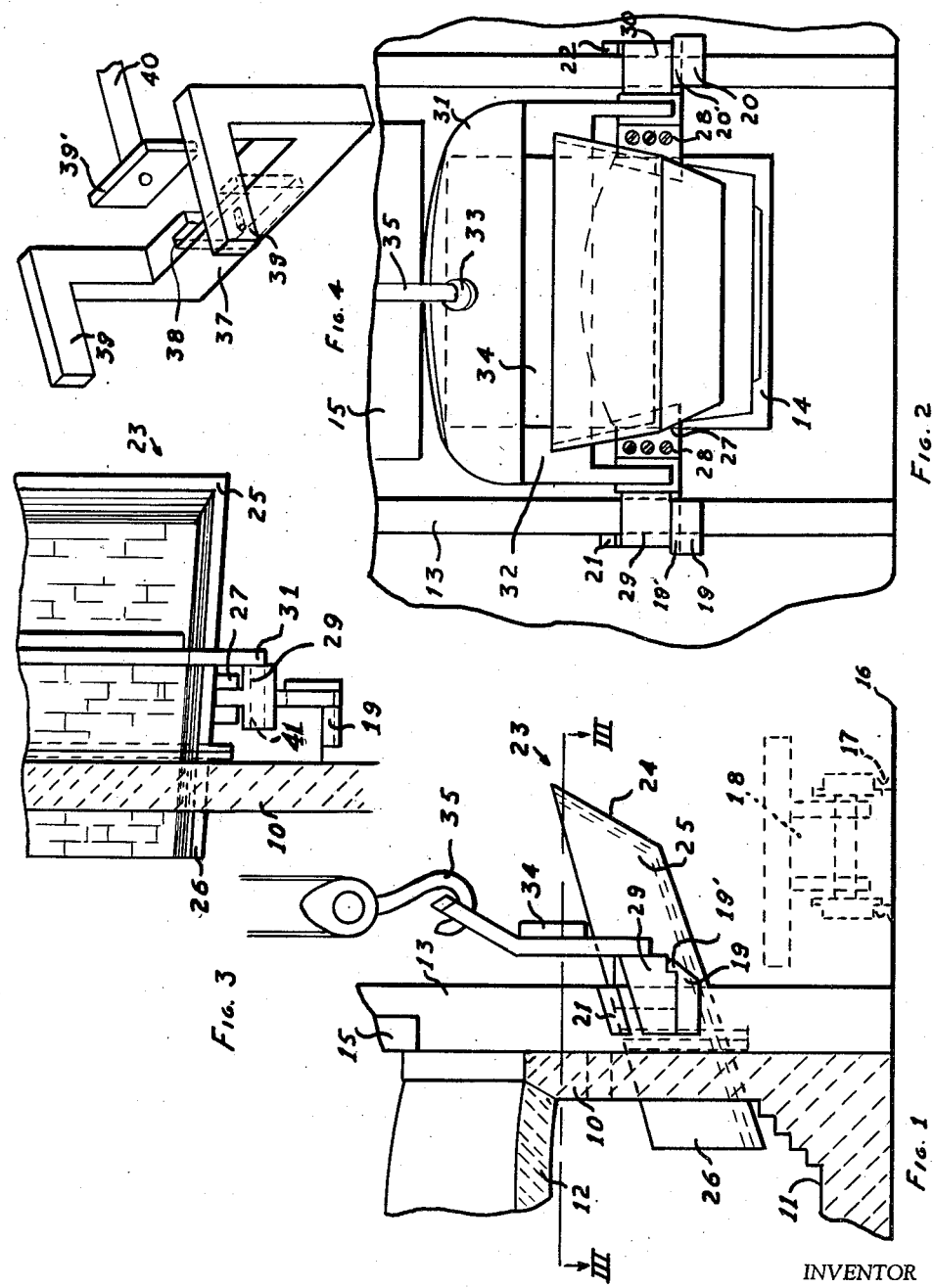
INVENTOR
KENNETH W. OTT
BY Francis J. Klempay
ATTORNEY

United States Patent Office 2,807,456
Patented Sept. 24, 1957

2,807,456

HOT METAL CHARGING APPARATUS FOR OPEN HEARTH FURNACES

Kenneth W. Ott, Poland, Ohio

Application December 28, 1955, Serial No. 555,902

5 Claims. (Cl. 266—34)

This invention relates to metallurgical apparatus and more particularly to an improved assembly for charging hot metal into open hearth furnaces. As presently and commonly constituted, the open hearth plant comprises a plurality of furnaces arranged longitudinally in line with a charging floor extending along the front of the furnaces at an elevation generally level with the hearths in the furnaces. Spaced along the front of the furnaces and at an elevation slightly above the charging floor are the charging doors which are used primarily to pass the solid constituents of the furnace heats but which are also conveniently utilized to pass the hot metal charges whereby the complete charging and control of the furnaces may be effected from the charging side of the furnaces. Extending parallel with and closely adjacent to the front walls of the furnaces, is trackage supported on the charging floor to transport the charging buggies on which are set the charging buckets holding the scrap metal and other solid constituents which are to be charged into the furnaces. Outwardly of the charging track is other parallel trackage on which moves the charging machines having movable peels to detachably engage, lift and manipulate the charging boxes to move the latter through the furnace doors to empty their contents into the furnaces. A heavy overhead crane is provided over the charging floor and in handling the hot metal, which constitutes a substantial portion of the tonnage of the heats of the furnaces, a large ladle is supported and manipulated by this crane for transfer between the hot metal mixer normally located at one extreme end of the charging floor beyond the furnaces and the furnace doors.

When charging hot metal from the hot metal cranes and ladles through the front doors of the furnaces, it has long been common practice to employ pouring spouts or troughs which, when in actual use, extend through the raised open doors of the furnaces to provide outer portions suitably located to receive the streams of hot metal issuing from the tilting ladles supported on the cranes and inner portions positioned within the furnaces. Heretofore such pouring spouts were provided with an inherent base for being supported directly on the charging floor of the open hearth plant and, further, were provided with permanently attached fittings for receiving the mating fittings on the forward ends of the charging machine peels so that the charging machines would be used to temporarily position the hot metal troughs as and when required at the respective furnaces.

The above general plant arrangement is objectionable in that the occasion of charging in of the furnaces of the plant with heat metal interrupts the normal routine of operation of the plant and creates, for the workmen, certain hazardous environments which heretofore have been the cause of many injurious accidents. First, the positioning of the hot metal spout or spouts directly on the charging floor blocks the movement of the charging buggy trains which impedes normal charging of the furnaces in itself in addition to the interruption of the charging and normal routine by requiring the charging machine to be taken off its regular work for handling and positioning the hot metal spout. The spout assembly, being a rather large piece of apparatus, must be stored, when not in use, well beyond the furnaces at either end of the charging floor thereby requiring extensive additional travel of the charging machine. The blocking of movement of the charging buggies impedes foot traffic about the furnaces, requiring more crawling about, which has heretofore caused many accidents. Also, in order to minimize the open time of the furnaces during hot metal charging, it is common practice to have the filled hot metal ladle on hand awaiting the positioning of the spout by the charging machine which makes for congestion of men and equipment which has been another cause of accidents.

The present invention has as its principal object the provision of novel procedures and apparatus which obviate the above outlined objectionable aspects of present hot metal charging practice in open hearth departments, and in furtherance of this object, I propose to mount the hot metal spout directly on the furnace proper in a readily detachable manner whereby the charging buggy tracks is kept free and clear for normal traffic during hot metal charging of the furnace. It is a further object of my invention to so construct the metal charging apparatus that it may be readily transported and manipulated by the secondary hoist on the overhead crane to thereby dispense with the need for utilizing the charging machine in connection with the hot metal spout whereby the normal routine of the operation of the plant is unimpeded even during hot metal charging.

A further object of the invention is the provision in apparatus of the kind described above and usable in the manner indicated of design arrangements whereby the apparatus may be readily disassembled and stored in a low place, as, for example, the space between the charging machine tracks on the charging floor and below the normal path of movement of the charging machine. In this manner, the required handling of the apparatus is minimized, and the apparatus is always closely available for use.

The above and other objects and advantages of the invention will become apparent upon consideration of the following specification and the accompanying drawing wherein there is disclosed the preferred embodiment of the invention.

In the drawing:

Figure 1 is a fragmentary vertical section through the front wall of an open hearth furnace showing my improved hot metal charging spout being spaced in position thereon;

Figure 2 is a front elevation of the apparatus of Figure 1;

Figure 3 is a horizontal section taken along the line III—III of Figure 1; and

Figure 4 is a perspective view of an auxiliary handling bracket by which the pouring spout of my invention may be manipulated by the peel of a furnace charging machine.

In the drawing, reference numeral 10 designates the front wall of an open hearth furnace which, in accordance with usual practice, is provided with a hearth 11, a roof 12, and vertically rising steel buckstays 13. Interposed between certain of the buckstays in the front wall of the furnace are a number of door openings only one of which is shown at 14. Opening 14 is adapted to be normally closed by a vertically slidable door 15 and it will become apparent that the hot metal charging apparatus of my invention may be inserted in the opening 14 immediately after the door 15 is raised and is instantaneously ready for use so that heat loss from the furnace will be kept to a minimum. Also in accordance with usual plant construction, there is shown a charging floor 16 extending outwardly from the front wall of the furnace and supported on this floor in close parallel relation with the front walls of the furnaces is a track 17 to movably support the charging buggies 18.

Welded or otherwise rigidly secured to the buckstays 13 on opposite sides of the door opening 14 are the L-shaped brackets 19 and 20 which overlie both the outside and the front surfaces of the buckstays 13, as shown. The forward extremities of the brackets 19 and 20 project above the top load-bearing surfaces of the brackets as shown at 19' to form upwardly extending hooks, the purpose of which will appear later. Also welded or otherwise rigidly secured to the outside surfaces of the buckstays 13 are the blocks 21 and 22 which are spaced above the brackets 19 and 20, respectively, and which slope downwardly in a rearward direction toward the furnace proper. The blocks 21 and 22 together with the brackets 19 and 20 form slots to receive the tines of the supporting brackets of the hot metal spout which will now be described.

The hot metal spout shown generally at 23 comprises a trough-like assembly which is open along its top and at its inner end and which is closed at its outer end by a sloping end wall 24. This spout has an outer shell preferably fabricated of heavy steel plate which is made in two sections—an outer section 25 which is normally positioned outside the furnace and an inner section 26 which normally extends through the opening 14 in the furnace wall and into the furnace proper. As shown in Figure 3, a flanged interconnection joins these two sections together and in actual practice, detachable bolts are preferably used to secure the two flanges together whereby the inner and smaller section of the spout may be readily detached from the outer or larger section thereof. This is advantageous since the high heat of the furnace causes rapid deterioration of the inner section of the spout, requiring frequent replacement of the same. The bottom and side walls as well as the sloping outer end wall of this spout is suitably lined with refractory brick to protect the metal of the shell of the spout from the molten metal charged into the furnace.

Rigidly mounted on the outer face of each of the side walls of the outer section 25 of the pouring spout 23 is a pair of spaced parallel and vertically disposed ears 27 which are suitably apertured to receive a number of heavy bolts or pins 28. Received in the pairs of ears 27 are the L-shaped brackets 29 and 30 which are shaped to overlie the front and outside surfaces of the buckstays 13 and to rest on the brackets 19 and 20 which are permanently secured to the buckstays. As shown in Figure 1, the upper surfaces of the rearwardly directed legs of the brackets 29 and 30 are tapered complementary to the bottom surfaces of the blocks 21 and 22. This not only facilitates entry of the rearwardly directed legs of the brackets 29 and 30 into the slots provided by the members 19 and 21 and the members 20 and 22, but prevents outward tilting movement of the brackets 29 and 30 and consequently of the pouring spout 23. It should be understood, of course, that the inner portions of the brackets 29 and 30 which are received between the pairs of ears 27 are rigidly connected to the spout 23 by the bolts 28. As shown more clearly in Figure 3, the front legs of the brackets 29 and 30 are enlarged in a front-to-rear direction immediately outward of the ears 27 and these enlargements are apertured from front to rear to receive the tines of handling equipment which will be described below. It should be also observed that the bottom front edges of the brackets 29 and 30 are rabbeted as shown in Figure 1 to receive the projections 19' and 20' of the brackets 19 and 20, respectively, whereby the brackets 29 and 30 are restrained from sliding movement outwardly of the furnace.

In the preferred embodiment of the invention, I provide a shield 31 which is formed of heavy plate and which, in normal position, lies in a generally vertical plane spanning the top of the spout structure. Shield 31 is formed at each end with an integral downwardly and rearwardly extending hook 32 the tines of which are adapted to be slidably received in apertures 41 formed in the front legs of the brackets 29 and 30. Centrally disposed in the upper portion of the shield 31 is an aperture 33 adapted to receive a hook 35 of an overhead crane assembly, not shown. In order that the hook 35 and supporting sheaves and cables may be positioned sufficiently outward of the front of the furnace, the upper portion of the shield 31 is bent outwardly, as shown in Figure 1. Suitably secured to the front face of the shield 31 is a refractory lining 34 which protects the metal of the shield from the splashing hot metal during hot metal charging of the furnace.

In using the apparatus described above, the hook 35 will normally be the lifting hook of the auxiliary hoist which is a normal component part of the overhead hot metal crane of the open hearth plant, the auxiliary hoist being more commonly used to tilt the hot metal ladle as will be understood by those skilled in the art. Thus, when it is desired to charge hot metal into a particular furnace, the auxiliary hoist and hook 35 may be first used to transport and/or position the pouring spout and shield assembly at the particular furnace door desired. Immediately thereafter, the metal may be poured and upon retraction of the ladle hook 35 may again be employed now to withdraw the spout and shield assembly whereupon the door 15 may be lowered and closed. In this manner, the furnace is charged with hot metal with a minimum of door opening time but without requiring the use of the furnace charging machine as heretofore required to handle the pouring spout. The spout and shield assembly may be stored, if desired, in the hot metal house at one end of the charging floor and thus well away from the furnace in which case the assembly may be brought down to the particular furnace to be charged by the auxiliary hoist along with the hot meal ladle. Alternatively, the assembly may be stored, between the periods of its use, directly on the charging floor, and it should be observed that since the shield 31 is readily disassembled from the spout proper, the assembly may be stored in a low place—for example, intermediate the charging machine tracks and below the path of travel of the charging machine framework. To pick up the disassembled spout and shield, the hook 35 is inserted in aperture 33 and the shield is then suspended so that its hooks may be readily guided into the apertures 41 in the brackets 29 and 30 on the spout, after which the whole assembly may be lifted and moved into position in the furnace door opening.

As stated initially, the advantage of this invention is not only that the charging machine need not be taken off its normal duties when it is desired to charge hot metal but also that the hot metal pouring spout is mounted fairly high on the furnace free and clear of the charging floor and sufficiently high to permit the unimpeded traffic of the charging buggies 18 even when loaded with charging boxes. Thus, the charging of the remaining furnaces in the plant may continue uninterruptedly with the trains of buggies remaining shiftable at will. This latter feature has the definite safety advantage in allowing the quick opening of foot traffic about the furnaces as required for normal control of the operation of the plant.

I preferably also provide an auxiliary handling device, as shown in Figure 4, whereby the pouring spout of my invention may be handled by the charging machine if the need for the same arose in certain situations. This auxiliary apparatus comprises a transverse member 37 which is provided in its rear wall portion with an upwardly open bayonet slot 38 to receive the head plate 39' of the charging machine peel 40. It will be understood that by lowering the head 39' into the slot 38 and locking the same therein by the movable pin in the peel in the manner normally employed for the charging boxes, the member 37 will be rigidly attached to the peel. Extending upwardly and rearwardly from the opposite ends of the member 38 are the arms 39 which are adapted to be received in the apertures 41 provided in the enlargements of the front legs of the brackets 29 and 30. Alternatively, the arms 39 may engage the lower surfaces of these enlargements to permit manipulation of the pouring spout when the shield 31 is in assembled relation thereto.

It should now be apparent that I have provided improved hot metal charging apparatus which accomplishes the objects initially set out. In addition to the above outlined advantages of facilitating the operation of the open hearth plant through elimination of the need for interrupting normal charging operations during hot metal charging while increasing safety for the workmen, the invention provides wide flexibility in the method of handling the hot metal pouring spout so that in any particular plant procedure the time required for hot metal charging is reduced while heat loss from the furnace is minimized. Also, since the spout may be removed from the furnace either by the overhead crane or by the charging machine, it is always possible to remove the same immediately after completion of the charging operation to thereby reduce the rate of deterioration of this apparatus in normal plant operation.

The above specifically described embodiment of the invention should be considered as illustrative only as many changes may be made in the details and features thereof without departing from the spirit or scope of the invention. Reference should therefore be had to the appended claims in determining the scope of the invention.

I claim:

1. Hot metal charging apparatus for an open hearth furnace having a front wall comprised of a pair of spaced vertical exposed buckstays and a charging door therebetween comprising a supporting bracket rigidly and permanently mounted on each of said buckstays, within the height of the door opening, a refractory-lined trough having an open inner end and a closed outer end adapted to be received in downwardly inclined relation with respect to and in said door opening, a pair of L-shaped brackets rigidly secured to the side walls of said trough and extending outwardly of said side walls and thence rearwardly and adapted to be supported on said first mentioned brackets whereby said trough may be detachably supported on said buckstays free and clear of the floor space in front of said door opening, the outwardly directed portions on said L-shaped brackets being each provided with a horizontally disposed aperture extending from front to rear, and further including a yoke-like member having spaced hook-like tines receivable in said apertures, said yoke-like member being adapted to be supported from a depending crane hook whereby said apparatus may be lifted into and out of position in said door opening.

2. Apparatus according to claim 1 further characterized in that said yoke-like member comprises a vertically disposed plate positioned across the open top of said trough and extending upwardly therefrom, the front face of said plate being refractory lined to form a splash shield when hot metal is poured into the exposed outer end of said trough.

3. Hot metal charging apparatus for an open hearth furnace having a front wall comprised of a pair of spaced vertical exposed buckstays and a charging door therebetween comprising a supporting bracket rigidly and permanently mounted on each of said buckstays, within the height of the door opening, a refractory-lined trough having an open inner end and a closed outer end adapted to be received in downwardly inclined relation with respect to and in said door opening, a pair of L-shaped brackets rigidly secured to the side walls of said trough and extending outwardly of said side walls and thence rearwardly and adapted to be supported on said first mentioned brackets whereby said trough may be detachably supported on said buckstays free and clear of the floor space in front of said door opening, said first mentioned brackets extending forwardly and on the outer sides of said buckstays to support both outwardly and rearwardly extending portions of said L-shaped brackets, and further including downwardly inclined blocks rigidly and permanently secured to the outside surfaces of said buckstays above said first mentioned brackets, the arrangement being such that said blocks oppose upward tilting movement of the rearwardly extending portions of said L-shaped brackets and consequently outward tilting movement of said trough.

4. Apparatus according to claim 3 further characterized in that said first mentioned brackets include along their forward extremities upwardly directed bights to overlie lower portions of the front faces to said L-shaped brackets to oppose forward sliding movement of the same.

5. Hot metal charging apparatus for an open hearth furnace having a front wall comprised of a pair of spaced vertical exposed and fixed buckstays and a charging door therebetween comprising a supporting bracket rigidly and permanently mounted on each of said buckstays within the height of the door opening, a refractory-lined trough having an open inner end and a closed outer end adapted to be received in downwardly inclined relation with respect to and in said door opening, a pair of brackets rigidly secured on opposite sides of said trough for coaction with said first mentioned brackets whereby said trough may be detachably supported in said door opening free and clear of the floor space in front of the furnace, and a coupling member having a pair of spaced rearwardly extending arms adapted to detachably engage the said second mentioned brackets on opposite sides of said trough, said coupling member having means for detachable interconnection with the forward free end of a charging machine peel whereby the charging machine may be used to support and move said trough into and out of position in said door opening.

References Cited in the file of this patent

UNITED STATES PATENTS

| 789,160 | Lindquist | May 9, 1905 |
| 1,707,937 | Gerlach | Apr. 2, 1929 |
| 1,883,976 | Kuzell | Oct. 25, 1932 |
| 1,983,578 | Chandler | Dec. 11, 1934 |
| 2,643,004 | Wingenroth | June 23, 1953 |

FOREIGN PATENTS

| 20,422 | Great Britain | Oct. 25, 1894 |